United States Patent

[11] 3,628,686

[72] Inventors Harold William Burton;
Harry Herbert Reynolds, both of
Birmingham, England
[21] Appl. No. 883,902
[22] Filed Dec. 10, 1969
[45] Patented Dec. 21, 1971
[73] Assignee Joseph Lucas (Industries) Limited
Birmingham, England
[32] Priority Dec. 20, 1968
[33] Great Britain
[31] 60,805/68

[54] MEANS FOR SUPPORTING A MEMBER IN A BORE
4 Claims, 2 Drawing Figs.
[52] U.S. Cl.................................................. 220/42 B,
215/48, 138/89

[51] Int. Cl.................................................. B65d 5/64
[50] Field of Search........................................ 220/42, 60;
215/48; 138/89

[56] References Cited
UNITED STATES PATENTS
2,840,113  6/1958  Simpson et al................  220/42 B X
3,115,981  12/1963  Darmstadt et al..............  215/48 X

*Primary Examiner*—George T. Hall
*Attorney*—Holman, Glascock, Downing & Seebold ABSTRACT: A plastic member to be supported in a cylindrical bore and comprising two parts, one of the parts having an annular edge to engage the bore, and the parts having respective snap-engaging formations, the formations on at least one of the parts being formed during molding of that part.

PATENTED DEC 21 1971

3,628,686

INVENTOR
Harold William Burton & Harry Herbert Reynolds
BY Holman Hancock
Downing & Seebold
ATTORNEYS

MEANS FOR SUPPORTING A MEMBER IN A BORE

The invention relates to means for supporting a plastics member in a cylindrical bore in a part to restrict axial sliding movement of the member in at least one direction.

Many ways of supporting members in bores have been devised, for example, forming a peripheral groove in the member and inserting a rubber ring in the groove. Though quite satisfactory for many purposes, it is sometimes inconvenient to form a groove since this cannot readily be formed by molding and requires a separate machining operation.

The object of this invention is to provide a plastics member to be supported in a cylindrical bore in a convenient and inexpensive form.

In accordance with the present invention, a plastics member to be supported in a cylindrical bore comprises two parts, one of the parts having an annular peripheral edge engageable with the bore as an interference fit, and the members having respective snap-engaging formations thereon whereby the parts are held together, the snap-engaging formation on at least one of the parts being formed during the molding of that part.

Figure 1:
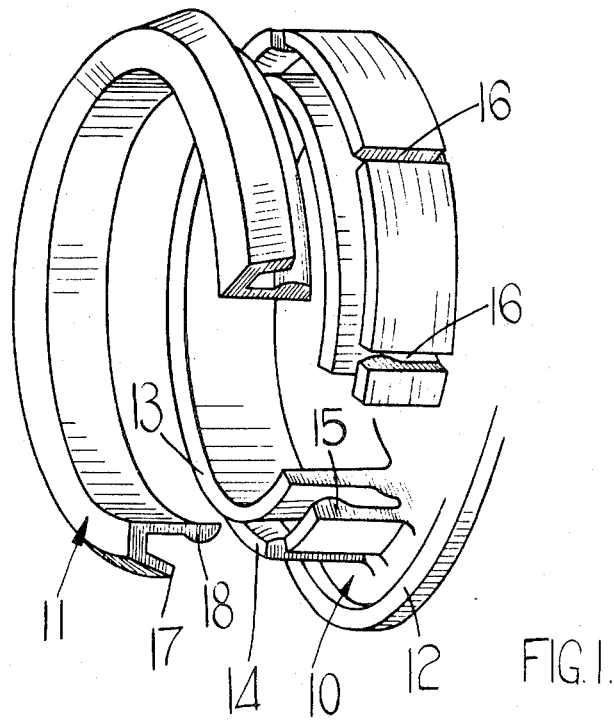
Figure 2:
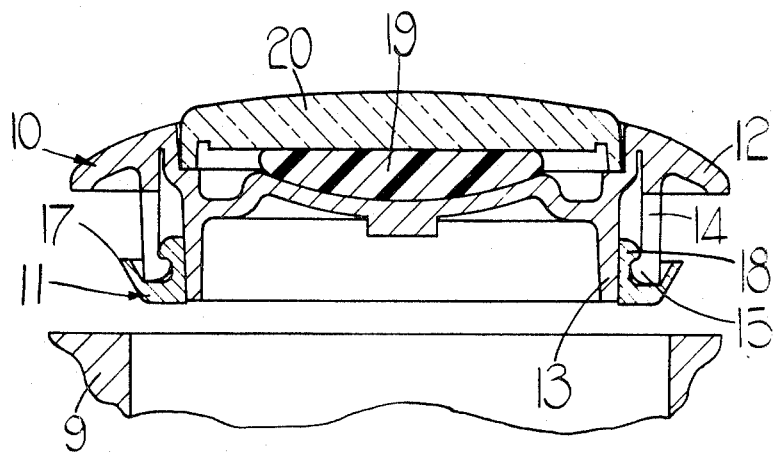

The invention will now be described by way of example with reference to the accompanying drawings, in which:

FIG. 1 is a partially broken away perspective view of a two-part member constructed in accordance with the invention, FIG. 2 is a cross-sectional view of the member.

The member illustrated is a closure member for the end of a tube in a vehicle-steering column (indicated at 9 in FIG. 2).

The member is formed in two parts 10 and 11, the part 10 having a peripheral ridged flange 12. This flange is intended to abut the end of the tube 9 in which the member is to be fitted. The part 10 has two concentric axially extending annular portions 13, 14, the portion 13 being the inner of the two and being continuous and of substantially uniform thickness. The outer annular portion 14 has an inwardly extending annular lip 15 at its free edge. The portion 14 is, however, sections which are separated by slots 16.

The other part 11 of the member is in the form of a ring of approximately U-shaped cross section. One limb of the U is inclined outwardly and terminates in a sharp edge 17. The other limb of the U has, at its free end, an outwardly presented annular lip 18.

The lips 15 and 17, on the parts 10 and 11, respectively, are intended to engage as illustrated in FIG. 2, and can be snapped into such engagement by spreading of the segmental sections of the portion 14. The shapes of the lips are such that the parts cannot easily be separated having once been assembled.

The part 10 has a central shaped recess for reception of a name plate 19 and a transparent cover 20 or other decorative material. Alternatively, a horn push mechanism may be housed within the central recess of the part 10.

The assembled member can be fitted into a bore in the tube 9, the edge 17 being an interference fit with the bore wall. Inward movement of the edge 17 takes place when the member is fitted into the bore, and the angle of engagement of the lip with the bore tends to restrict movement of the member out of the bore.

The members 10 and 11 are formed from differing plastics material which, in this example, are both thermoplastic material resins, which, however, have some resilience to allow the parts to be snapped into interengagement. Thermosetting plastics materials may be used.

The parts 10 and 11 are formed by molding but in an alternative construction, the part 11 is formed as an extrusion which is bent round into a ring before being assembled onto the part 10.

Having thus described our invention what we claim as new and desire to secure by Letters Patent is:

1. A plastics member to be supported in a cylindrical bore comprising two parts, one of the parts having an annular peripheral edge engageable with the bore as an interference fit, and the members having respective snap-engaging formations thereon, whereby the parts are held together, the snap-engaging formation on at least one of the parts being formed during the molding of that part, the snap-engaging formations on one of the parts comprising a continuous lipped annular portion and the other snap-engaging formation on the other of said parts comprising a lipped annular portion formed as plurality of spaced segmental sections, the lips of said portion being engageable to retain the parts together.

2. A plastics member as claimed in claim 1 in which one of the parts, on which said annular edge is formed, is of generally U-shaped cross section with said edge formed on its outer limb.

3. A plastics member as claimed in claim 1 in which one of the parts has an annular formation formed during molding of that part and the other part is formed by extrusion and is bent to form a ring to engage the other part.

4. A plastics member as claimed in claim 1 forming a closure member for the end of the bore, said member carrying decorative material.

* * * * *